United States Patent [19]
Anani

[11] Patent Number: 5,449,576
[45] Date of Patent: Sep. 12, 1995

[54] MULTILAYERED ELECTROLYTE AND ELECTROCHEMICAL CELLS USING SAME

[75] Inventor: Anaba A. Anani, Lauderhill, Fla.

[73] Assignee: Motorola, Inc., Schaumburg, Ill.

[21] Appl. No.: 329,601

[22] Filed: Oct. 26, 1994

Related U.S. Application Data

[63] Continuation-in-part of Ser. No. 157,500, Nov. 26, 1993, Pat. No. 5,387,482.

[51] Int. Cl.$^6$ ............................................. H01M 6/18
[52] U.S. Cl. .................................... 429/191; 429/192; 429/193
[58] Field of Search ........................ 429/191, 192, 193

[56] References Cited

U.S. PATENT DOCUMENTS

| | | | |
|---|---|---|---|
| 4,599,284 | 7/1986 | Akridge | 429/191 |
| 4,810,599 | 3/1989 | Kondo et al. | 429/191 |
| 5,085,953 | 2/1992 | Akridge et al. | 429/193 |
| 5,273,846 | 12/1993 | Plichta et al. | 429/193 |
| 5,276,547 | 1/1994 | Couput et al. | 359/270 |
| 5,300,374 | 4/1994 | Agrawal et al. | 429/192 |
| 5,387,482 | 2/1995 | Anani | 429/191 |

OTHER PUBLICATIONS

Journal of Power Sources, 43-44 (1993) 103-110 (Month N/A).

Primary Examiner—Stephen Kalafut
Assistant Examiner—M. Nuzzolillo
Attorney, Agent, or Firm—Kenneth M. Massaroni

[57] ABSTRACT

A thin film multi-layered electrolyte for a rechargeable electrochemical cell, and a rechargeable electrochemical cell including said electrolyte. The multi-layered electrolyte consists of a primary electrolyte material having at least one secondary electrolyte material disposed on one surface thereof. The secondary electrolyte material should be selected so as to have a potential stability window sufficient to prevent decomposition of the primary electrolyte, while preventing chemical reactions leading to the formation of ionically non-conducting materials on the surface of the electrodes of the electrochemical cell. A rechargeable electrochemical cell is made by disposing the multi-layered electrolyte material between a positive and negative electrode.

8 Claims, 1 Drawing Sheet

# MULTILAYERED ELECTROLYTE AND ELECTROCHEMICAL CELLS USING SAME

CROSS REFERENCE TO RELATED APPLICATIONS

This application is a continuation-in-part of U.S. application Ser. No. 08/157,500, filed Nov. 26, 1993, now U.S. Pat. No. 5,387,482, entitled "MULTILAYERED ELECTROLYTE AND ELECTROCHEMICAL CELLS USING SAME", and assigned to Motorola, Inc.

TECHNICAL FIELD

The invention relates generally to the field of rechargeable electrochemical cells, and more particularly, to electrochemical battery cells including electrolytes.

BACKGROUND OF THE INVENTION

There is a great deal of interest in developing better and more efficient methods for storing energy for applications such as radio communication, satellites, portable computers, and electric vehicles, to name but a few. Accordingly, there have been recent concerted efforts to develop high energy, cost-effective battery cells having improved performance characteristics. Electrochemical battery cells are preferred and hence widely used in these applications since the chemical reactions that take place in the cells can be converted into useful electrical energy. An electrochemical battery cell uses its reactive components, namely the positive and negative electrodes, to generate an electric current. The electrodes are separated from one another by an electrolyte which maintains the simultaneous flow of ionic conduction between the two electrodes. Electrons flow from one electrode through an external circuit to the other electrode completing the circuit.

Rechargeable, or secondary, cells are more desirable than primary (non-rechargeable) cells since the associated chemical reactions are reversible. Accordingly electrodes for secondary cells must be capable of being regenerated (i.e., recharged) many times. The development of advanced rechargeable battery cells depends on design and selection of appropriate materials for the electrodes and the electrolyte.

Present day cells use alkali metals and ions as electroactive species. These cells obtain maximum voltage when the negative electrode is the zero-valent metal. Alloys of lithium and/or other low voltage intercalation materials, such as carbon, are sometimes used as the active component in the negative electrode. State-of-the-art positive electrodes can be fabricated from a material having the empirical formula $A_xM_yO_z$, where A is a metal selected from groups IA or IIA of the periodic chart, M is a transition metal, O is oxygen and x, y, and z represent the relative combining ratios of each element. Positive electrodes manufactured with materials having this formula are fully disclosed in commonly assigned, co-pending U.S. patent application Ser. No. 08/116,646 filed Sep. 7, 1993, the disclosure of which is incorporated herein by reference. Other types of positive electrode materials commonly known in the art may also be employed.

Currently, electrolytes disposed between the positive and negative electrodes include a polymer, such as poly-ethylene-oxide (PEO), impregnated with a salt in a solvent. Preferred salts include, for example, $LiPF_6$. Ethylene carbonate, diethyl carbonate and combinations thereof are used as the solvent. A schematic representation of the prior art cell is illustrated in FIG. 1. Specifically, FIG. 1 illustrates a positive electrode 1 and a negative electrode 20 as described hereinabove. Disposed between said positive and negative electrodes is the electrolyte layer 30. Positive electrode/electrolyte interface 32 is created at the boundary between the positive electrode 10 and the electrolyte 30. Similarly, a negative electrode/electrolyte interface 34 created at the boundary of the negative electrode 2 and the electrolyte 30. As may be appreciated from perusal of FIG. 1, the electrolyte is in direct contact with both the negative and positive electrodes.

Present day, state-of-the-art polymer electrolyte batteries are often plagued however by electrode/electrolyte incompatibilities. For example, at the negative electrode/electrolyte interface 34, the negative electrode and the electrolyte solvent may react to form a ionically insulating layer on the surface of the negative electrode material. This ionically insulating layer blocks active material reaction sites, effectively isolating the negative electrode. The result is reduced capacity with cycling, (i.e., repeated cell charge/discharge) and poor cycle life.

At the positive electrode/electrolyte interface 32 problems include thermodynamic instability of the electrolyte due to the higher electrode potentials of the positive electrode. This causes electrolyte decomposition, and electrolyte out-gassing. The result of outgassing and decomposition is increased internal cell pressure, reduced cell performance, and ultimately, explosive cell failure. Until now, the problem of electrolyte decomposition has been addressed by operating the cell at less than the positive electrode's half cell potential. That is at a potential at which the electrolyte remains stable. This, however, results in decreased energy density, and decreased charge per cycle.

Accordingly, there exists a need for an electrolyte which has enhanced conductivity, yet reduces the occurrence of deleterious reactions taking place at the negative and positive electrode/electrolyte interfaces.

SUMMARY OF THE INVENTION

Briefly, according to the invention, there is provided a multi-layered electrolyte for a rechargeable electrochemical cell. The electrolyte consists of a primary electrolyte layer having at least one secondary electrolyte layer disposed on one side thereof.

In another embodiment of the invention, the multi-layered electrolyte includes a primary electrolyte operatively disposed between two secondary electrolytes. The multi-layered electrolyte is disposed between the positive and negative electrodes of the electrochemical cell. The first secondary electrolyte layer is disposed between, and in direct contact with, both the primary electrolytes and the negative electrode. The first secondary electrolyte layer is fabricated of a material which is chemically stable in the presence of the negative electrode, and has a potential stability window that overlaps the lower end of the primary electrolytes potential stability window. The second secondary electrolyte layer is disposed between, and in contact with, both the primary electrolyte and the positive electrode. The second secondary electrolyte layer should be fabricated of a material having a potential stability window low enough to prevent decomposition of the primary elec trolyte, while high enough to be stable at the highest operating potentials of the positive electrode. The first and second layers of secondary electrolyte material may either be fabricated of the same or different materials.

In a further embodiment of the invention, there is disclosed a lithium polymer type secondary electrochemical cell comprising a lithium containing negative electrode, a positive electrode fabricated of a material having a high electrode potential versus lithium, and a multi-layered electrolyte material operatively disposed between the negative and positive electrodes. The multi-layered electrolyte is of the type described hereinabove.

DETAILED DESCRIPTION OF THE PREFERRED EMBODIMENTS

Figure 1:
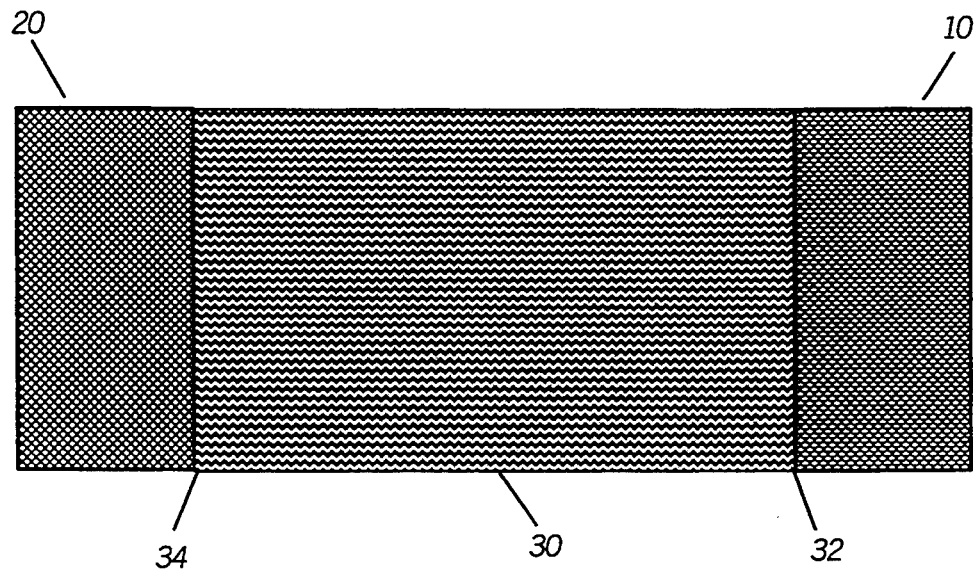
FIG. 1 is a schematic representation of the prior art design of thin film Lithium polymer-electrolyte electrochemical cells.
Figure 2:
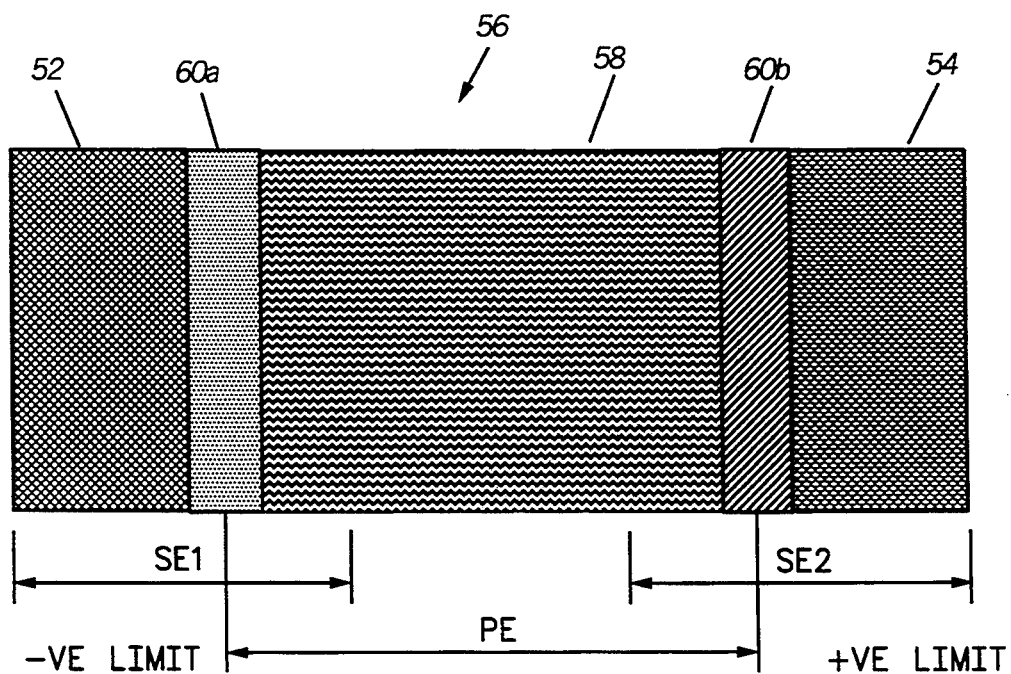
FIG. 2 is a schematic representation illustrating multilayered electrolyte wherein thin film secondary electrolytes are disposed on each side of the primary electrolyte, and in contact with the negative and positive electrodes of a thin film Lithium polymer electrochemical cell, in accordance with the current invention.

The present invention relates to electrolyte structures for electrochemical cells, and cells made including those electrolyte structures. Referring now to FIG. 2, there is illustrated therein, an electrochemical cell 50 including negative and positive electrodes and the primary and secondary electrolyte of the present invention. The electrochemical structure 50 includes a negative electrode 52 fabricated of, for example, elemental lithium. Of course, other materials may be selected for use as the negative electrode, such as, for example, lithium alloys, e.g., Al/LiAl, $Li_xSi$, Wood's alloy, lithiated carbon, and other low potential intercelation materials such as materials having the formula $Li_xMN_y$ where M is a transition metal, and N is selected from oxygen, sulfur or silicon.

The electrochemical cell further includes a positive electrode 54 fabricated of, for example, materials having high electrode potentials versus lithium. Specific examples of these materials include: lithiated oxides of transition metals such as $Li_xNiO_y$, $Li_xVO_y$, $LiMnO_y$, $LiCoO_y$, and $LiTiS_y$. It is to be understood that when materials other than elemental lithium are used as the negative electrode, the positive electrode may also be varied. Thus, for example, when the negative electrode is fabricated of lithiated carbon, the positive electrode may be $Li_xCoO_y$. Other combinations of negative electrode and positive electrode materials, will be readily apparent to one of ordinary skill in the art.

Operatively disposed between the negative electrode 52 and the positive electrode 54 is a multi-layered electrolyte 56 comprising a primary electrolyte 58 and first and second secondary electrolytes 60a and 60b perspectively. In the situation in which the cell 50 is a lithium cell, the primary electrolyte 58 can be, for example, a polyethelene oxide material having a lithiated salt impregnated therein and further including a solvent material. Examples of the solvent may include ethylene carbonate, diethyl carbonate or propylene carbonate. The lithiated salt impregnated into the polyethylene oxide polymer may include, for example, lithium hexaflourophosphate, lithium hexaflouro-arsouate or a lithium amide salt. Other materials will be readily apparent to those skilled in the art.

Operatively disposed between the primary electrolyte 58 and the negative electrode 52, is a first secondary electrolyte 60a in direct contact with both the negative electrode 52 and the primary electrolyte 58. Similarly, a second secondary electrolyte 60b is operatively disposed between and in direct contact with, both primary electrolyte 58 and positive electrode 54. It is to be understood that while FIG. 2 illustrates a secondary electrolyte layer disposed on each side of the primary electrolyte, it need only be disposed on one side.

There are several selection criteria which must be considered when identifying potential materials to serve as a secondary electrolyte. These include:

1. The selected secondary electrolyte material must be very thin so that ionic conductivity is comparable to that of the primary electrolyte;
2. The material must be able to be deposited to a thickness sufficient to prevent electron tunneling through the secondary electrolyte layer, yet still be thin enough to allow ionic conductivity.
3. The electronic conductivity of the secondary electrolyte must be at or near zero so as to assure proper performance of the electrochemical cell;
4. At the negative electrode/primary electrolyte interface:
   a. the secondary electrolyte must be chemically stable, particularly with respect to lithium, so as to avoid side reactions which deposit ionically non-conductive layers on the surface of the negative electrode; and
   b. the secondary electrolyte must have a potential stability window that overlaps the lower end of the primary electrolyte window in order to avoid chemical and/or electrochemical reaction between the two, thus assuring thermodynamic and electrochemical capability.
5. At the positive electrode/primary electrolyte interface, the secondary electrolyte must:
   a. have a potential stability window high enough to eliminate, or substantially reduce, electrolyte decomposition when the positive electrode is working at maximum potential; and
   b. have a lower potential limit low enough to prevent decomposition of the primary electrolyte.

The desired potential stability windows of the secondary electrolytes are illustrated in FIG. 2. In the potential scale illustrated in FIG. 2 the line labeled PE represents the primary electrolyte potential stability window, the line labeled SE1 is the potential stability window of the first secondary electrolyte, and the line labeled SE2 is the potential stability window of the second secondary electrolyte. As may be noted from FIG. 2, PE does not cover the entire accessible potential range of the negative electrode, identified as $-ve$ limit. Similarly, PE does not reach the upper limit of the positive electrode, labeled $+ve$ limit. As a result, the primary electrolyte is unstable under certain conditions, leading to the problems described above.

However, the first secondary electrolyte is stable to the lowest potential range of the negative electrode, as is illustrated by SE1, while still stable well into the lower range defined by PE. Hence using a first secondary electrolyte with a potential stability window as defined by SE1, provides a thermodynamically stable, and compatible interface without deleterious reaction products. Similarly SE2 defines how the potential stability window of the second secondary electrolyte must overlap PE in order to achieve a stable interface.

Using the selection criteria enumerated above, exemplary materials that can be employed advantageously as a secondary electrolyte at the negative electrode/primary electrolyte interface include, but are not limited to, $LiAlEt_4$, $LiI(Al_2O_3)$, $LiIXCH_3OH$, $Li_3N$, $LiI$, and combinations thereof. Similarly, materials which may be employed advantageously as the secondary electrolyte at the positive electrode/primary electrolyte interface include materials such as but not limited to, $LiF$, $Li_xPO_y(N)$ and Li-S based glasses.

Lithium ion conducting glasses are based on either oxides, sulfides or a combination of oxides and sulfides. Typically a lithium ion conducting glass will have a general formulation comprising a lithium conducting salt, a glass former, a glass modifier and in some cases, a stabilizer. The lithium conducting salt is selected from the group consisting of $LiI$, $LiBr$, $LiCl$, $LiF$, and combinations thereof; the modifier is selected from $Li_2O$ and $Li_2S$ and combinations thereof; the stabilizers are selected from the group of $Al_2O_3$, $Al_2S_3$, $Ga_2S_3$, and combinations thereof; and the glass formers are selected from the group consisting of $B_2S_3$, $SiS_2$, $P_2S_5$, $B_2O_3$, $SiO_2$, $P_2O_5$, and combinations thereof. An example of a ternary combination lithium ion conducting glass with ion conductivity in the order of approximately $10^{-3}$ S/cm is: $LiI + Li_2S + SiS_2 + B_2O_3$.

The multi-layered electrolyte structure described herein may be manufactured by any number of known techniques. Thus, for example, the secondary electrolyte material may be fabricated as a sheet of material and laminated directly upon the primary electrolyte material. Conversely, the secondary electrolyte material may be deposited as a coating upon the primary electrolyte material by any of a number of known techniques. Examples of these deposition techniques include electrochemical deposition, sputtering, and glow-discharge, to name but a few. Regardless of method of applying the secondary electrolytes structure, the thickness must be sufficient to prevent electron tunneling therethrough. Accordingly the thickness of the secondary electrolyte material should be on the order of approximately 1 to 20 microns, with a thickness of approximately 5 to 10 microns being preferred. In any event, the thickness of the secondary electrolyte material must not be so thick as to prevent ion conductivity.

The above illustration was chosen to describe and explain the principles and practical applications of the subject invention, and to enable those skilled in the art to utilize the invention in various embodiments and modifications as are suitable for the particular use contemplated. The foregoing description of the invention, therefore, has been present only for purposes of describing the subject invention. It is not intended to be exhaustive, or to limit the invention to the precise forms disclosed. Many modifications and variations will occur to those skilled in the art without departing from the spirit and/or scope of the invention.

I claim:

1. A multilayer electrolyte for use in an electrochemical cell, comprising a primary electrolyte including polymer substrate and an active ingredient impregnated therein; and a secondary electrolyte disposed on at least one side of said primary electrolyte, said secondary electrolyte being fabricated of a lithium ion conducting glass.

2. An electrolyte as defined in claim 1, wherein said lithium ion conducting glass comprises a lithium conducting salt, a glass former, and a glass modifier.

3. An electrolyte as defined in claim 2, wherein said salt is selected from the group of $LiI$, $LiBr$, $LiCl$, $LiF$, and combinations thereof.

4. An electrolyte as defined in claim 2, wherein said modifier is selected from the group consisting of $Li_2O$, $Li_2S$, and combinations thereof.

5. An electrolyte as defined in claim 2, wherein said glass former is selected from the group consisting of $B_2S_3$, $SiS_2$, $P_2S_5$, $B_2O_3$, $SiO_2$, $P_2O_5$, and combinations thereof.

6. An electrolyte as defined in claim 2, further comprising a stabilizing material.

7. An electrolyte as defined in claim 6, wherein said stabilizing material is selected from the group of $Al_2O_3$, $Al_2S_3$, $Ga_2S_3$, and combinations thereof.

8. An electrolyte as defined in claim 1, wherein said lithium ion conducting glass is a ternary combination having the formula $LiI + Li_2S + SiS_2 + B_2O_3$.

* * * * *